United States Patent
Crump et al.

(10) Patent No.: US 7,533,183 B1
(45) Date of Patent: May 12, 2009

(54) CENTRAL CONTROL OF MULTIPLE ADDRESS DOMAINS WITHIN A ROUTER

(75) Inventors: Richard H. Crump, Boston, MA (US); Janet Y. Doong, Chelmsford, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 685 days.

(21) Appl. No.: 10/040,975

(22) Filed: Dec. 28, 2001

(51) Int. Cl.
  *G06F 15/173* (2006.01)
  *H04L 12/28* (2006.01)
  *H04L 12/56* (2006.01)

(52) U.S. Cl. .................. 709/232; 370/395.31
(58) Field of Classification Search ......... 709/238–244; 370/351–430
See application file for complete search history.

(56) References Cited

U.S. PATENT DOCUMENTS

| | | | |
|---|---|---|---|
| 6,069,895 A * | 5/2000 | Ayandeh ..................... 370/399 |
| 6,081,524 A * | 6/2000 | Chase et al. ................. 370/389 |
| 6,188,671 B1 * | 2/2001 | Chase et al. ................. 370/232 |
| 6,324,583 B1 * | 11/2001 | Stevens ....................... 709/230 |
| 6,339,595 B1 * | 1/2002 | Rekhter et al. .............. 370/392 |
| 6,438,612 B1 * | 8/2002 | Ylonen et al. ................ 709/249 |
| 6,526,056 B1 * | 2/2003 | Rekhter et al. .............. 370/392 |
| 6,594,704 B1 * | 7/2003 | Birenback et al. ........... 709/238 |
| 6,674,756 B1 * | 1/2004 | Rao et al. ................ 370/395.21 |
| 6,772,211 B2 * | 8/2004 | Lu et al. ..................... 709/226 |
| 6,829,238 B2 * | 12/2004 | Tokuyo et al. ............... 370/392 |
| 6,847,611 B1 * | 1/2005 | Chase et al. ................. 370/232 |
| 7,054,319 B2 * | 5/2006 | Akahane et al. ........ 370/395.53 |
| 7,095,740 B1 * | 8/2006 | Jagannath et al. ........... 370/392 |
| 2001/0050914 A1 * | 12/2001 | Akahane et al. ............. 370/382 |
| 2002/0023152 A1 * | 2/2002 | Oguchi ....................... 709/223 |
| 2003/0041170 A1 * | 2/2003 | Suzuki ....................... 709/238 |
| 2003/0051048 A1 * | 3/2003 | Watson et al. ............... 709/238 |
| 2003/0112799 A1 * | 6/2003 | Chandra et al. ............. 370/389 |

OTHER PUBLICATIONS

Moy, J. "Request for Comments (RFC) 1247: OSPF Version 2", Network Working Group, Jul. 1991, 124 pages.*

* cited by examiner

*Primary Examiner*—George C Neurauter, Jr.
(74) *Attorney, Agent, or Firm*—Guerin & Rodriguez, LLP

(57) ABSTRACT

A domain manager of a router uses a mapping array that includes pointers to associate interfaces of the router with routing tables. The domain manager executes a single IP stack to receive packets from a plurality of address domains through the interfaces, and identify routing tables according to the mapping array. The mapping array associates interfaces connecting to the same address domain with the same routing table. Information in each of the routing tables is updated independently of other routing tables.

8 Claims, 5 Drawing Sheets

CENTRAL CONTROL OF MULTIPLE ADDRESS DOMAINS WITHIN A ROUTER

TECHNICAL FIELD

This invention relates to central control of multiple address domains within a router.

BACKGROUND

Referring to FIG. 1, a router 10 is connected to networks 11, 12, 13, and 14 through interfaces 110, 120, 130, and 140, which are, for example, Ethernet cables. In a practical environment, router 10 can route packets through thousands of interfaces to thousands of networks.

Router 10 includes a routing table 15 for recording routing information. The routing information contains status and configurations of routes to which router 10 has access. The routes in routing table 15 can be determined according to a routing protocol, e.g., BGP (Border Gateway Protocol), OSPF (Open Shortest Path First), or RIP (Routing Information Protocol). BGP is an Internet protocol that allows routers across autonomous systems (e.g., company networks or university networks) to share routing information, thereby establishing efficient, loop-free routes. OSPF and RIP are routing protocols that allow routing information to be exchanged by routers within an autonomous system.

Router 10 also includes a routing table manager (RTM) 16 that performs central routing process and manages routing table 15. The central routing process comprises an IP (Internet Protocol) stack that runs router-executable processes, e.g., Unix processes. When a packet arrives at one of the interfaces 110, 120, 130, and 140, router 10 executes processes in the IP stack to perform specified functions according to the type of the packet. If the packet is a data packet, the IP stack selects a route from routing table 15, and forwards the packet according to the route. If the packet is a route update packet, as will be described below, the IP stack executes appropriate protocols to update routing table 15.

A route update packet is submitted to routing table manager 16 when a change occurs in a route accessible by router 10. A change in a route, for example, can be a configuration change in a remote network to which router 10 has access. Such a change can affect how router 10 routes incoming data packets to their respective destinations, and therefore is recorded in routing table 15.

In one scenario, referring to FIG. 1, a change in a route has occurred in a network indicated by a network address 192.32.27.0. In addition to network 192.32.27.0, the routing domain also includes networks 11, 12, and networks 13, 14, respectively.

The change in network 192.32.27.0 is submitted to routing table manager 16 through interfaces 120 and 130. If the change submitted by one interface, e.g., interface 120, arrives before the other interface, e.g., interface 130, routing table manager 16 will update routing table 15 according to the change submitted by interface 120. When another identical change subsequently arrives from interface 130, routing table manager 16 will treat the change as a new update. Routing table manager 16 will compare the later-arrived change with a corresponding entry in routing table 15, keep the one with better performance, and discard the other one.

In certain scenarios, it is desirable to maintain separate routing tables for different address domains. For example, an independent business entity that subscribes to a VPN may want to assure privacy in its network configurations. The VPN is subscribed from an ISP (Internet Service Provider), which includes a router in its backbone network to provide routing service to all of its VPN subscribers. To prevent routing information of one VPN from being seen by another, the ISP can maintain a separate routing table in the router for each VPN subscriber and update the table independently of others.

Referring to FIG. 2, a router 20 includes two routing tables 151 and 152, each for one of the address domains, domain A and domain B. Router 20 is partitioned into two virtual routers 101 and 102, each functioning like a traditional router (e.g., router 10). Each of the virtual routers 101 and 102 maintains a stack, a routing table (151 or 152), and a routing manager (161 or 162). Information received from domain A propagates through an interface 110' or 120' to reach routing manager 161 and routing table 151, while information received from domain B propagates through an interface 130' or 140' to reach routing manager 162 and routing table 152. Each routing table records routes for one of the address domains. The two routing tables are independently updated, and information in one routing table is not shared with the other.

When a change occurs in a network common to domain A and domain B (e.g., network 197.32.27.0), the change is submitted to routing table managers 161 and 162. The routing table managers receive the change from respective interfaces (120' and 130'), execute respective IP stacks, and update respective routing tables (151 and 152). Although the use of multiple routing tables and IP stacks ensures privacy in routing information for each address domain, running multiple IP stacks on one physical router 20 nevertheless limits the router's ability to scale.

SUMMARY

In an aspect of the invention, a method for routing a packet comprises receiving the packet from one of a plurality of address domains through one of a plurality of interfaces; and determining one of a plurality of routing tables for the packet according to a mapping array. The mapping array includes pointers that associate the interfaces with the routing tables.

Embodiments of this aspect of the invention may include one or more of the following features.

The method further comprises executing a single IP stack to receive the packet and determine the one routing table. The mapping array associates interfaces connecting to the same address domain with the same routing table. After the one routing table is determined, the method further comprises forwarding the packet according to the one routing table if the packet is a data packet, or updating the one routing table if the packet is a route update packet. An example of the address domain includes a virtual private network In another aspect of the invention, a router comprises: interfaces through which packets from address domains are received; and a domain manager that includes a mapping array for determining one of a plurality of routing tables for the received packets. The mapping array includes pointers that associate the interfaces with the routing tables.

Embodiments of this aspect of the invention may include one or more of the following features.

The domain manager executes a single IP stack to receive the packet and determine the one routing table. The mapping array associates interfaces connecting to the same address domain with the same routing table. The domain manager forwards the packet according to the determined one routing table if the packet is a data packet, or updates the determined one routing table if the packet is a route update packet. An example of the address domain includes a virtual private network.

In yet another aspect of the invention, a computer program product residing on a computer readable medium comprises instructions for causing the computer to: receive the packet from one of a plurality of address domains through one of a plurality of interfaces; and determine one of a plurality of routing table for the packet according to a mapping array. The mapping array includes pointers that associate the interfaces with the routing tables.

Embodiments of this aspect of the invention may include one or more of the following features.

The computer program product further comprises instructions for causing the computer to execute a single IP stack to receive the packet and determine the one routing table. The mapping array associates interfaces connecting to the same address domain with the same routing table. After the one routing table is determined, the computer program product comprises instructions for causing the computer to forward the packet according to the one routing table if the packet is a data packet, or to update the one routing table if the packet is a route update packet. An example of the address domain includes a virtual private network.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
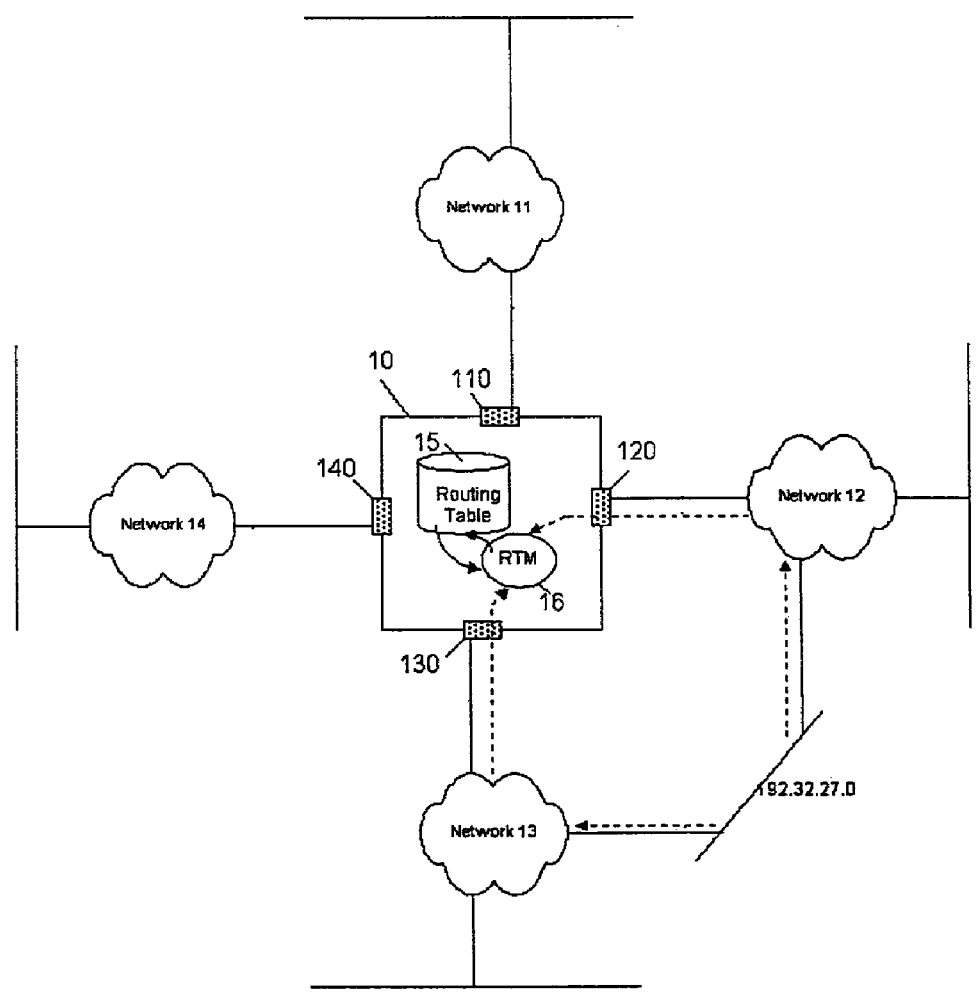
FIG. 1 is a known router having a single routing table for a single address domain.
Figure 2:
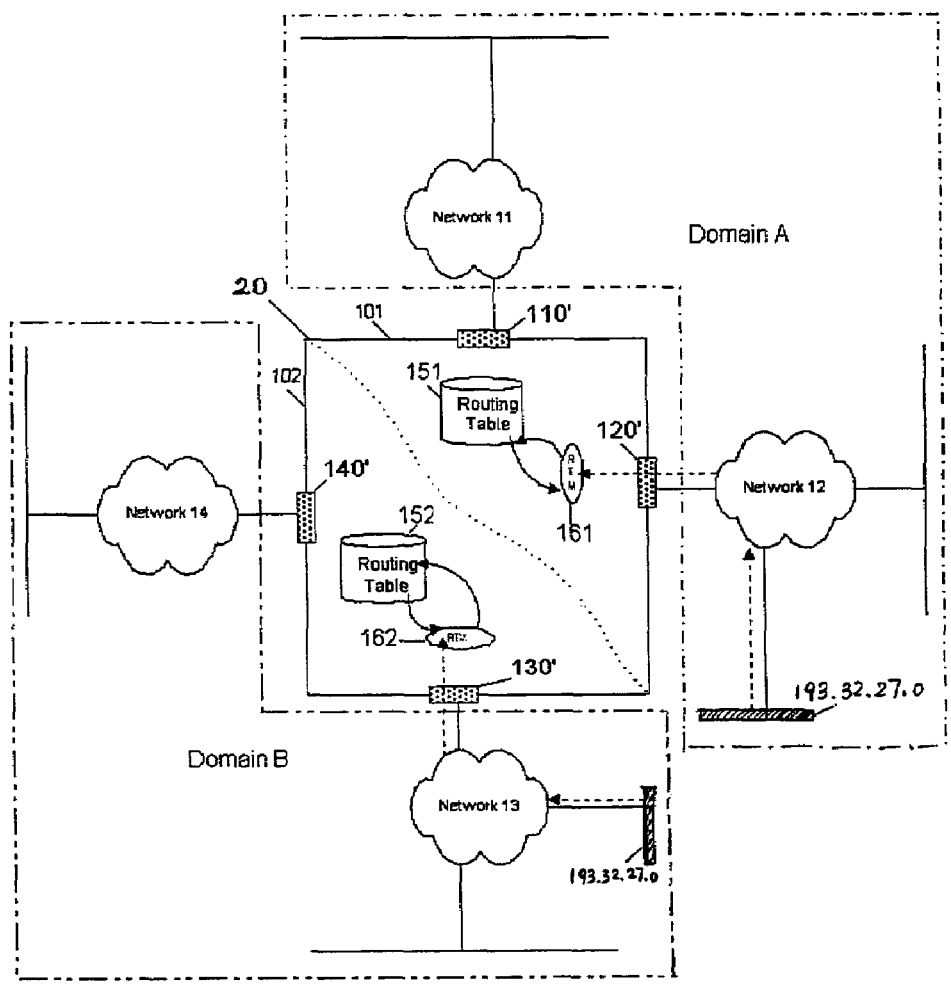
FIG. 2 is another known router partitioned as a plurality of virtual routers.
Figure 3:
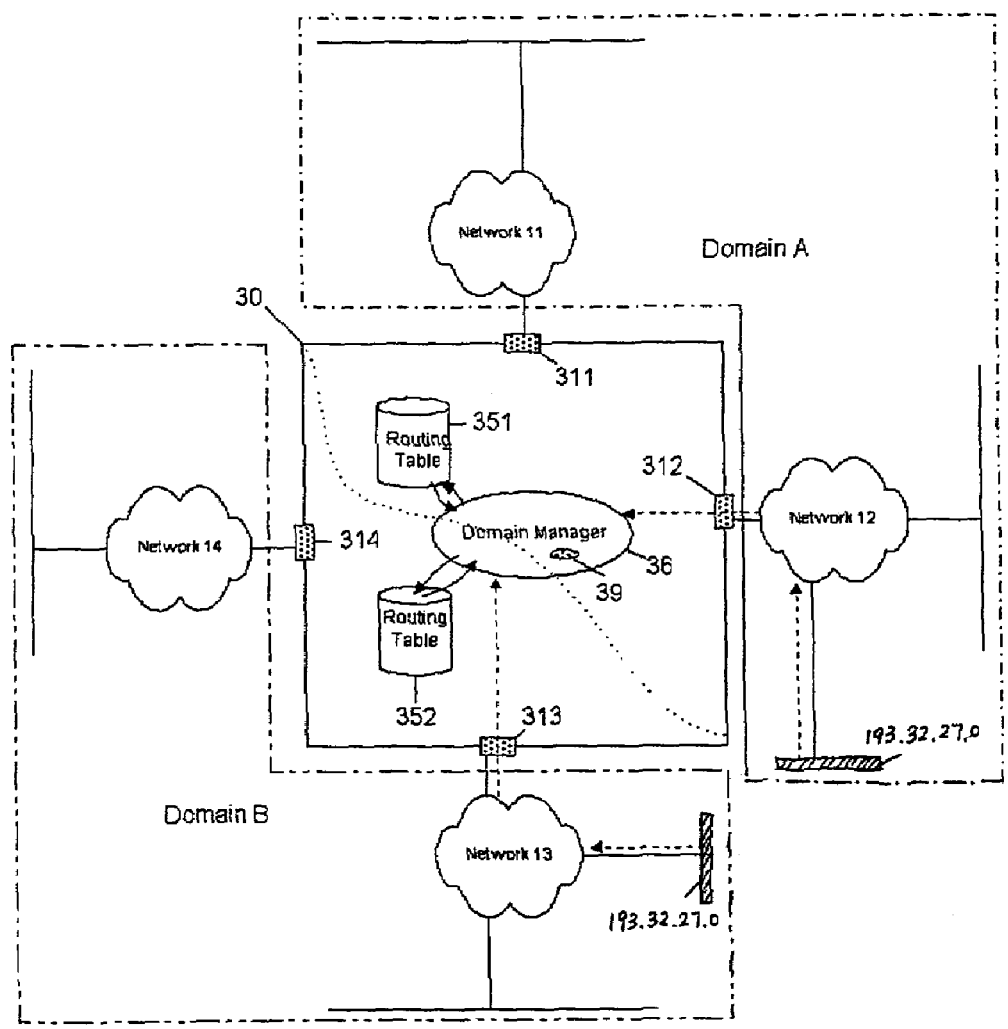
FIG. 3 is a router that uses a domain manager to dispatch packets to their respective routing tables.

Referring to FIG. 3, router 30 is connected to networks 11, 12, 13 and 14 through interfaces 311, 312, 313, and 314, respectively. Networks 11 and 12 belong to domain A, and networks 13 and 14 belong to domain B. The address domains, for example, can be VPNs (Virtual Private Networks). In FIG. 3, each VPN is connected to router 30 through multiple interfaces. Each interface can be connected to a different business location of the VPN, or to the same location for the purpose of redundancy.

Router 30 includes a domain manager 36 that runs a single IP stack to perform central routing process. In contrast to router 10, which also includes only one routing table manager 16 running an IP stack, domain manager 36 manages access to more than one routing table. Routing tables 351 and 352 are domain-specific; that is, routing table 351 is used to handle packets propagating in domain A, while routing table 352 is used to handle packets propagating in domain B. Domain manager 36 can be implemented in software, hardware (e.g., ASICs (Application-Specific Integrate Circuits)), or a combination of both.

Domain manager 36 is responsible for dispatching packets coming from all interfaces 311, 312, 313, and 314 to appropriate routing tables (351 or 352). For each packet arriving at a given interface, domain manager 36 identifies an appropriate routing table by using a mapping array 39. Mapping array 39, being part of the domain manager's central control logic, includes pointers that associate a given interface to a routing table. Interfaces for the same address domain share the same routing table. For example, interfaces 311 and 312, which are both connected to domain A, submit incoming packets to the same routing table 351.

By using a separate routing table for each address domain, domain manager 36 assures privacy in routing information for multiple domains. If multiple interfaces that are connected to different address domains, e.g., interfaces 312 and 313, learn a route change in a network common to these address domains, e.g., domain A and domain B, the route change will be submitted to router 30 through both of the interfaces. Domain manager 36 will update each of routing tables 351 and 352 independently to reflect the change. The independent updates do not introduce scalability problems as exemplified by router 20, because router 30 only executes one IP stack to handle packets arriving from all address domains. The use of mapping array 39 allows domain manager 36 to efficiently associate interfaces to routing tables with only one IP stack.

Figure 4:
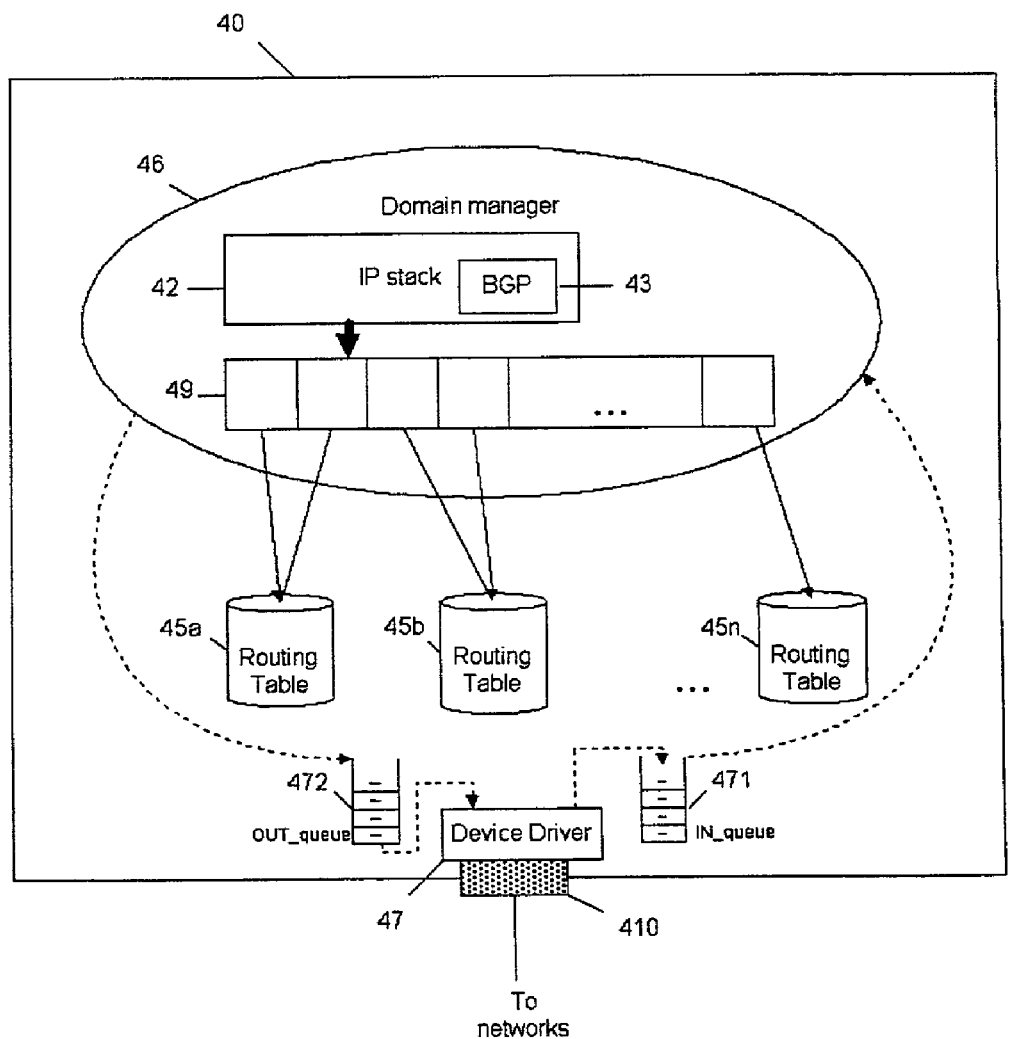
FIG. 4 illustrates a mapping array used by the domain manager.

Referring to FIG. 4, a router 40 includes a plurality of interfaces connected to a plurality of address domains. Router 40 includes a domain manager 46, which runs a single IP stack 42 and performs the same function as domain manager 36. Each interface (e.g., interface 410) of router 40 has an associated device driver 47, which manages incoming and outgoing bit streams. Device driver 47 assembles the incoming bit streams into packets in an IN_queue 471 for domain manager 46 to fetch, and disassembles outgoing packets coming from the domain manager into bit streams in an OUT_queue 472. To inform domain manager 46 of the interface through which an assembled packet comes in, device driver 47 also inserts an interface number for its associated interface 410 in the packet before the packet is fetched by the domain manager. Based on the interface number, IP stack 42 locates a pointer in mapping array 49 that points to one of routing tables 45a, 45b, . . . , 45n. Each of the routing tables 45a, 45b, . . . , 45n is associated with interfaces that are connected to the same address domain.

Figure 5:
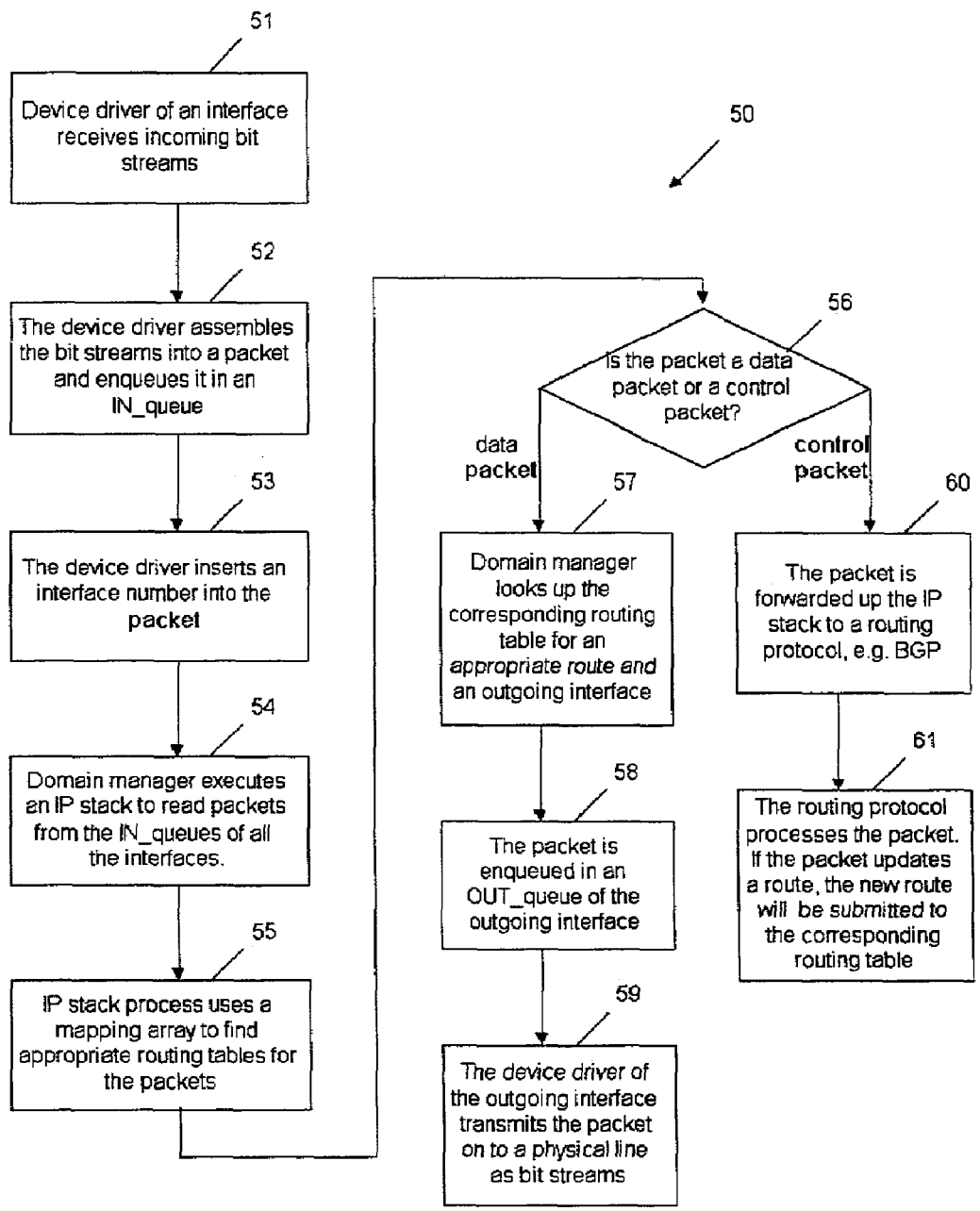
FIG. 5 is a flow diagram that illustrates a process of the router for processing packets.

Referring to FIG. 5, a flow diagram shows a process 50 for processing a packet at router 40. When bit streams arrive at any of the interfaces of router 40, e.g., interface 410, device driver 47 associated with that interface receives 51 the bit streams and assembles 52 them in IN_queue 471 until the entire packet is completed. Device driver 47 also inserts 53 the interface number of interface 410 into the packet. Domain manager 46 executes IP stack 42 to read 54 packets from the IN queues of all the interfaces of router 40, including the packet in IN_queue 471. The packets are dequeued after they are read. For the packet that arrives through interface 410, according to the interface number in the packet, IP stack 42 locates 55 a pointer in mapping array 49 that points to a routing table 45 corresponding to interface 410.

IP stack 42 also identifies 56 the packet as either a data packet or a control packet. If the packet is a data packet that needs to be forwarded to a destination network, domain manager 46 will look up 57 the corresponding routing table 45 for an appropriate route and an appropriate outgoing interface. The packet will be enqueued 58 in the OUT_queue 472 of the outgoing interface, and the device driver 47 of that interface will disassemble the packet into bit streams and transmit 59 them on to a physical line that leads to the destination network.

If the packet is a control packet, the packet may contain a protocol update message or route update information that requires the corresponding routing table 45 to be updated. Domain manager 46 will forward 60 the packet up IP stack 42 to a routing protocol 43, e.g., BGP, as pre-determined by the address domain to which the packet belongs. According to the message or information specified in the control packet, routing protocol 43 updates 61 the corresponding routing table 45.

Accordingly, other embodiments are within the scope of the following claims.

What is claimed is:

1. A method for routing packets in a router having a plurality of router interfaces through which the packets are received from a plurality of address domains, the method comprising:
   dedicating a separate routing table in the router to each address domain of the plurality of address domains;
   associating each router interface with one of the routing tables;
   executing a single IP stack to receive a packet from any of the router interfaces and to identify the associated routing table in the router for handling the received packet and,
   in the event of a route change received from more than one of the plurality of address domains, updating each routing table associated with each address domain for which a route change has been received via the single IP stack.

2. The method of claim 1, wherein a mapping array associates interfaces connecting to the same address domain with the same routing table.

3. The method of claim 1, wherein executing a single IP stack forwards a received packet according to the identified routing table when the received packet is a data packet and updates the identified routing table when the received packet is a control packet.

4. The method of claim 1 wherein each of the plurality of address domains represents a virtual private network.

5. A router comprising:
   a plurality of router interfaces through which packets from a plurality of address domains are received;
   a separate routing table in the router associated with each address domain; and
   a domain manager executing a single IP stack to receive a packet from any of the router interfaces and to identify an appropriate associated routing table in the router for handling the received packet the domain manager functional in the event of a route change received from more than one of the plurality of address domains to update each routing table associated with each address domain for which a route change has been received via the single IP stack.

6. The router of claim 5, wherein the domain manager comprises a mapping array that associates each interface to a routing table.

7. The router of claim 5, wherein the domain manager executing the single stack forwards a received packet according to the identified routing table when the received packet is a data packet and updates the identified routing table when the received packet is a control packet.

8. The router of claim 5 wherein each of the plurality of address domains represents a virtual private network.

* * * * *